No. 829,934. PATENTED AUG. 28, 1906.
F. K. VREELAND.
APPARATUS FOR THE PRODUCTION AND UTILIZATION OF UNDAMPED
OR SUSTAINED ELECTRICAL OSCILLATIONS.
APPLICATION FILED NOV. 14, 1905.

Witnesses:
Jas. F. Coleman
John S. Totich

Inventor
Frederick K. Vreeland
By Dyer & Dyer
Attorneys.

No. 829,934. PATENTED AUG. 28, 1906.
F. K. VREELAND.
APPARATUS FOR THE PRODUCTION AND UTILIZATION OF UNDAMPED
OR SUSTAINED ELECTRICAL OSCILLATIONS.
APPLICATION FILED NOV. 14, 1905.

Witnesses:

Inventor
Frederick K. Vreeland
By Dyer & Dyer
Attorneys.

No. 829,934. PATENTED AUG. 28, 1906.
F. K. VREELAND.
APPARATUS FOR THE PRODUCTION AND UTILIZATION OF UNDAMPED
OR SUSTAINED ELECTRICAL OSCILLATIONS.
APPLICATION FILED NOV. 14, 1905.

Witnesses:
Jas. F. Coleman
John S. Potch

Inventor
Frederick K. Vreeland
By Dyer & Dyer
Attorneys.

No. 829,934. PATENTED AUG. 28, 1906.
F. K. VREELAND.
APPARATUS FOR THE PRODUCTION AND UTILIZATION OF UNDAMPED
OR SUSTAINED ELECTRICAL OSCILLATIONS.
APPLICATION FILED NOV. 14, 1905.

Witnesses:

Inventor

Attorneys.

UNITED STATES PATENT OFFICE.

FREDERICK K. VREELAND, OF MONTCLAIR, NEW JERSEY, ASSIGNOR TO WIRELESS TELEGRAPH EXPLOITATION COMPANY, OF NEW YORK, N. Y., A CORPORATION OF NEW YORK.

APPARATUS FOR THE PRODUCTION AND UTILIZATION OF UNDAMPED OR SUSTAINED ELECTRICAL OSCILLATIONS.

No. 829,934.      Specification of Letters Patent.      Patented Aug. 28, 1906.

Original application filed February 28, 1905, Serial No. 247,826. Divided and this application filed November 14, 1905. Serial No. 287,223.

*To all whom it may concern:*

Be it known that I, FREDERICK K. VREELAND, a citizen of the United States, residing at Montclair, in the county of Essex and State of New Jersey, have invented a certain new and useful Apparatus for the Production and Utilization of Undamped or Sustained Electrical Oscillations, of which the following is a description.

The object of this invention is the generation of undamped or sustained electrical oscillations of definite frequency, and especially alternating currents of high frequency, without the aid of mechanical translating devices.

Undamped oscillations of low frequency may be obtained by mechanical means, but the frequency is limited by practical considerations governing the design and construction of the apparatus. Oscillations of higher frequency are desirable for many purposes, as is well known, and especially for the production of electromagnetic waves for use in wireless telegraphy, wireless telephony, and for similar purposes. For this service low-frequency oscillations are unsuited owing to their small radiating power.

Where high-frequency currents are desired, it is usual to employ the free oscillations which may occur in a circuit containing capacity and inductance. A certain initial supply of energy is imparted to the oscillating system, by charging the condenser, for example, and this energy takes the form of alternating currents of a frequency determined by the electrical constants of the circuit, which alternating currents continue with constantly-decreasing amplitude until all the energy is expended in radiation or in ohmic and other losses. Such oscillations are thus always damped, and their usefulness is therefore greatly limited.

By the apparatus herein described, the free oscillations of an electrical circuit are also utilized, but these oscillations are sustained by feeding energy into the circuit constantly or at intervals in synchronism with the oscillations to supply that lost in radiation and otherwise, and thus the oscillations are maintained at a constant amplitude as long as the supply of energy continues. This I accomplish by employing the energy of the oscillating circuit to produce, directly or indirectly, opposite or synchronous effects upon a sensitive gap or gaps which will be so related to the oscillating circuit as to supply energy thereto and maintain the oscillations. This may be done by the effect of a magnetic field upon a current in a solid or liquid conductor or in a rarefied gas or upon an open or inclosed arc, or by the effect of an electrostatic field upon the discharge of cathode particles in a vacuum-tube, or by the diversion of magnetic flux by the cross magnetomotive force of an auxiliary field, or by the direct effect of an electric current on the conductivity of the circuit in which it flows, or by other means of electrically commutating energy. I prefer to employ the effect of a magnetic field upon a sensitive gap or gaps formed by the electric current passing through one or more vacuum-tubes, such as mercury-vapor tubes. This magnetic field may be directly excited or have its excitation controlled by the electrical oscillations of the oscillating circuit, and its effect upon the vapor tube or tubes will be, according to one or another arrangement, to divert the current passing through the sensitive gap or gaps or to vary the conductivity of such gap or gaps, so as to produce an electrical commutation of the current between different circuits which are related to the oscillating circuit, in such manner as to add energy thereto by this commutation in synchronism with the oscillations.

The invention may be carried out in many different ways and with a variety of forms of apparatus, some of which are illustrated in the accompanying drawings.

Figure 1:
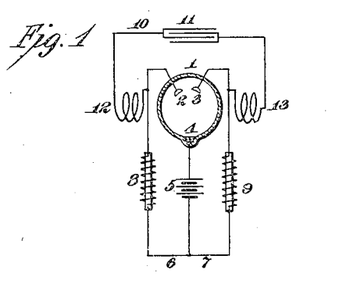

Figure 1 illustrates in diagram an arrangement which I have found effective. In this figure, 1 is a mercury-vapor tube, having anodes 2 3, and a mercury cathode 4. 5 is a source of direct current connected by two branches 6 7 with the anodes 2 and 3 respectively. These branches 6 and 7 include large inductances 8 9 for maintaining a steady current. 10 is the oscillating circuit, containing a condenser 11. This circuit is shunted across the anodes 2 3, and includes the field-coils 12 13. It should be understood that for simplicity of illustration the field-coils 12 13 are shown with their axes in the plane of the anodes 2 3, while in practice they are placed in a plane perpendicular to that in which the anodes are located, so that the magnetic flux will be perpendicular to the plane of the anodes. In starting the apparatus, it is first necessary to establish the current across the sensitive gap formed by the tube 1. This may be done in any of the well-known ways. At the start the current tends to divide equally between the two parallel paths, but there is always some variation in the distribution due to variable inequalities in the conductivities of the two paths. This is especially true when a mercury-vapor tube is used. These irregular fluctuations are usually sufficient to start the oscillations; after which they give place to the periodic fluctuations controlled by the alternating field; but where an additional impetus is required, this may be supplied by giving the condenser a sudden initial charge, by short-circuiting one of the inductances 8 9 and then suddenly removing the short circuit, or by otherwise disturbing the equilibrium of the system. When the magnetic field deflects the current in the tube, say from the anode 2 to the anode 3, the tendency is for the current in both branches 6 and 7 to pass wholly or largely through the tube from the anode 3 to the cathode 4, due to the fact that the path through the tube from the anode 2 to the cathode 4 is interrupted or increased in resistance by the deflection of the current toward the anode 3. As the inductances 8 9 oppose any change in the current passing through them, this results in the current in the branch 6 flowing through the oscillating circuit 10 from left to right, including both field-coils 12 13, thereby producing a field which still further deflects the current from 2 to 3. When the condenser is charged to the requisite potential, this current is checked and reversed, thereby producing a field in the opposite direction which deflects the current in the tube from the anode 3 to the anode 2. The result of this deflection is to cause the current in both branches 6 and 7 to pass through the tube from the anode 2 to the cathode 4, which results in the current in the branch 7 flowing through the oscillating circuit from right to left and producing a current in the field-coils 12 13 which still further deflects the current from the anode 3 to the anode 2. In this way energy is supplied to the oscillating circuit in synchronism with the oscillations. The frequency of these oscillations is dependent upon the constants of the oscillating circuit and may be changed by changing such constants.

Figure 2:
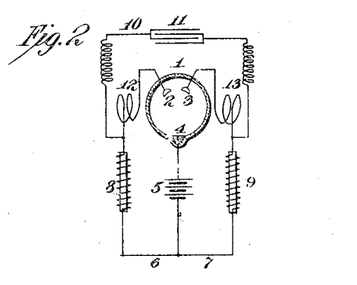

The field-coils, instead of being connected in shunt to the anodes of the tube, may be connected in series therewith, as illustrated in Fig. 2, which is a diagram of the same character as Fig. 1. In this arrangement the field-coils 12 and 13 are placed directly in the branch circuits 6 7 between the inductances 8 9 and the anodes 2 3, and the oscillating circuit 10 is completed through these coils by connecting that circuit with the branches 6 7 between the field-coils 12 13 and the inductances 8 9. Extra inductances may be placed in the oscillating circuit, as shown. When the magnetic field tends to deflect the current in the tube from the anode 2 to the anode 3, the current in the branch 6 will be deflected through the oscillating circuit from left to right and will energize the magnetic field, producing a field tending to still further deflect the current from the anode 2 to the anode 3. The reversal of the current in the oscillating circuit will energize the magnetic field in the opposite direction, deflecting the current in the tube from the anode 3 to the anode 2 and causing the current in the branch 7 to pass through the oscillating circuit from right to left, producing a still further energization of the magnetic field in the same direction.

Figure 3:
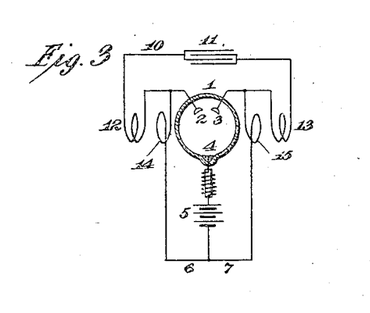

Another arrangement is that illustrated in Fig. 3, which is a diagram similar to the figures already described, and in which a compound excitation of the magnetic field is provided. The oscillating circuit is shunted across the anodes, as in Fig. 1, and is provided with the field-coils 12 13, while additional field-coils 14 15 are located in the branches 6 and 7. The direction of winding of coils 14 and 15 is such that their fields oppose and neutralize each other when they are traversed by equal battery currents. When the magnetic field tends to deflect the current from the anode 2 to the anode 3, the current in the branch 6 passes through the oscillating circuit from left to right, energizing the coils 12 13. The current in the coil 14 diminishes somewhat, and that in the coil 15 increases, thus adding to the magnetic effect of coils 12 and 13. The resultant magnetic field tends to still further deflect the current to the anode 3. The reversal of the oscillating circuit reverses the field, deflects the current from anode 3 to anode 2, and causes the current in the branch 7 to flow through the oscillating circuit from right to left.

Figure 4:
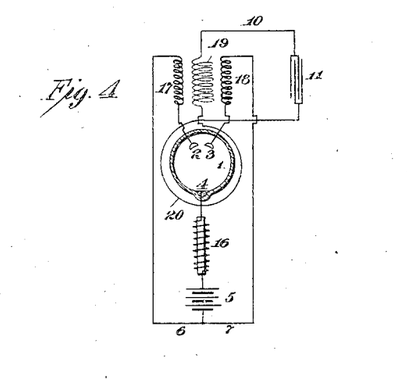

In Fig. 4 is shown a secondary series arrangement for the excitation of the field. A steadying inductance 16 is placed in the undivided portion of the battery-circuit. In the branches 6 and 7 are located oppositely-wound primary coils 17 18 of a transformer, of which 19 is the secondary. The secondary coil 19 is located in the oscillating circuit 10, and the field-coil 20 is located in the oscillating circuit. The field-circuit is shown in this figure as in its proper relation to the plane of the anodes. The primary coils 17 18, being similar but being wound in opposite directions, an increasing current in 17 will have the same effect on the secondary 19 as a decreasing current in 18. The oscillating current in the circuit 10 will deflect the current in the tube from one anode to the other, so that the current from the battery will flow alternately in the two primary coils 17 and 18 of the transformer, and these variations in the primary current acting cumulatively on the secondary 19 induce in the secondary the electromotive force necessary to overcome resistance and other losses and sustain the oscillations in the oscillating circuit 10. Either primary coil 17 18 may be used alone to excite the oscillating circuit, or each may act upon a separate oscillating circuit.

Many modifications of the arrangements shown in Figs. 1 to 4 may be employed.

Figure 5:
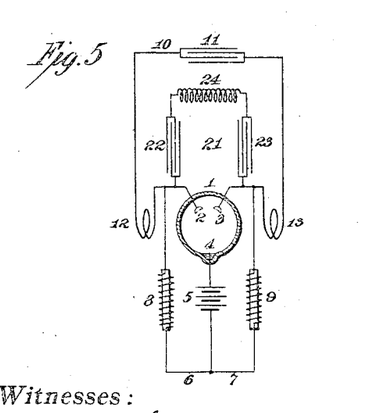

In Fig. 5 an arrangement similar to Fig. 1 is shown, with the addition of another shunt-circuit 21, connected across the anodes 2 3, and containing condensers 22 23 and an inductance 24, forming an additional oscillating circuit. If the two oscillating circuits are tuned in unison, they will oscillate in parallel, and the circuit 21 may be used as the working circuit, while the circuit 10 serves only to excite the field. If the two oscillating circuits are not exactly in tune, there will be a wattless component of current leading in one circuit and lagging in the other according as the capacity reactance or the self-induction reactance preponderates. Thus by varying the constants of the two circuits any desired phase relation may be secured between the current in the field-coils and the terminal electromotive force across 2 and 3, though usually it is desirable to have the electromotive force and the current in phase with each other.

Figure 6:
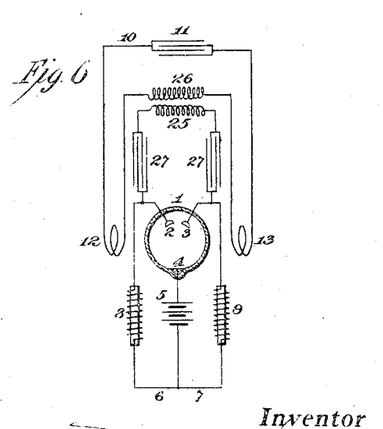

In Fig. 6 is shown an arrangement in which the field-coils 12 13 are located in the oscillating circuit 10 connected inductively through the transformer 25 26 to the primary circuit. The primary 25 of the transformer is shunted across the anodes 2 3 and includes one or more condensers 27. The condenser or condensers 27 permit the tuning of the primary circuit with respect to the secondary.

Figure 7:
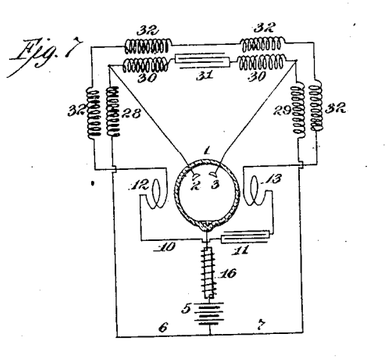

In Fig. 7 is shown an arrangement combining certain features of Figs. 4 and 6. The primaries 28 29 of a transformer are connected in series with the anodes 2 3, and a third primary 30, which may also include a condenser 31, is shunted across the anodes 2 3. The secondary coil 32 is acted on cumulatively by all three of the primaries, and includes in its circuit the field-coils 12 13 and the condenser 11.

Figure 8:
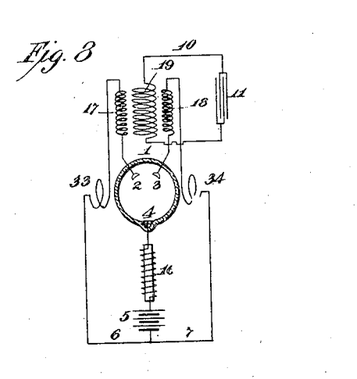

Fig. 8 illustrates an arrangement similar to Fig. 4, but with the field-coils located in the primary instead of in the secondary circuit. The secondary current serves to control the frequency of the field through the action of the secondary 19 on the primaries 17 18. The field-coil is divided into two sections 33 34 located respectively in the circuits 6 7.

These field-coils are wound in opposite directions, so that their magnetic fields will oppose and neutralize each other when the current is divided equally between the circuits 6 7. When, however, there is an unequal distribution of current in these circuits, the field produced by one coil will predominate over that produced by the other, and will cause the current to be deflected to one or the other of the two anodes, as in the case illustrated in Fig. 4.

Figure 9:
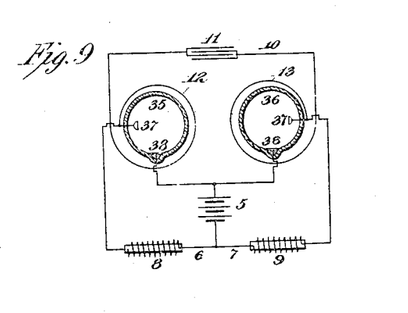

Instead of using a single vapor-tube with two anodes, two asymmetrical vapor-tubes 35 36 may be employed, as illustrated in Fig. 9. Each of these tubes has an anode 37 and a mercury-cathode 38, the anode of each tube being located at one side of the tube close to the cathode, so that when the current is diverted by the magnetic field toward the anode, the current will flow in a short path from the anode to the cathode, while if the current is deflected away from the anode, the current will follow a longer path and one of greater resistance. The arrangement of circuits for exciting the magnetic field shown in Fig. 1 is selected for illustration in Fig. 9, but any other arrangement may be employed. The cathodes of the two tubes are connected together and with a source 5 of direct current. The circuit is divided into two branches 6 7, including large inductances 8 9, and these branches 6 7 extend to the anodes of the two tubes. The oscillating circuit 10, including the condenser 11, is shunted across from one anode to the other, and includes the field-coils 12 13, one of which surrounds the tube 35 and the other the tube 36. The field-coils 12 13 affect the tubes 35 36 oppositely. When the current in the oscillating circuit 10 flows in one direction, it deflects the current in the tube 35 away from the short path between the anode and cathode, increasing the resistance of the path through which the current flows, while in the tube 36 the field deflects the current toward the short path between the anode and the cathode, thus giving the minimum resistance in this tube. The result of this is to cause the larger part of the current in the branch 6 to flow through the oscillating circuit from left to right, strengthening the fields in the direction to augment their effect upon the tubes. A reversal of the current in the oscillating circuit reverses the fields, and causes the path in the tube 36 to lengthen and increase in resistance, and the path in the tube 35 to shorten and decrease in resistance, with the result that the current in the branch 7 passes largely through the oscillating circuit from right to left, adding energy to the oscillating circuit and increasing the strength of the current in the field-coils.

Figure 10:
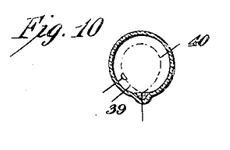

The shifting of the current between paths of different lengths and resistances is illustrated in Fig. 10, in which the dotted line 39 illustrates the path that the current will take through the tube when the polarity of the magnetic field is such as to deflect the current toward the anode, while the dotted line 40 shows the path that the current will take through the tube when the polarity of the field is reversed. The increased current density in the short path tends to still further increase its conductivity under suitable conditions.

Figure 11:
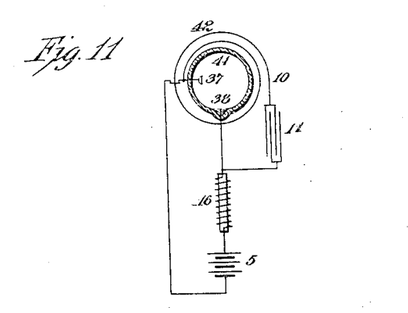

A single asymmetrical tube may be employed to produce the electrical commutation of the current between two circuits, as illustrated in Fig. 11, in which the tube 41 is provided with the single anode 37 and the mercury cathode 38 placed close together on one side of the tube. The oscillating circuit 10, including the condenser 11, is shunted across the anode and cathode, and includes the field coil 42 surrounding the tube. The anode and cathode are also connected by another circuit, includng the source of direct current 5 and a steadying inductance. A plus current, for illustration, in the oscillating circuit and the field-coil will deflect the discharge through the tube to the right, or cause it to follow the path of great length and resistance illustrated by the line 40 in Fig. 10. Since the battery current is made constant by the inductance, the increase in resistance of the path through the tube will force part of the current to pass through the oscillating circuit in shunt to the tube, and will increase the deflection of the current in the tube to the right, thus forcing more current through the oscillating circuit. When the condenser 11 is charged to a certain limiting point, its electromotive force will prevent a further flow of the current in this direction, and the current in the oscillating circuit will reverse, causing a deflection of the discharge to the left, or to the short path 39 shown in Fig. 10. This reduces the resistance of the path through which the current passes in the tube, and allows an increase of current from the anode to the cathode, and a corresponding increase in the minus current in the oscillating circuit. The oscillations will thus be maintained.

Figure 12:
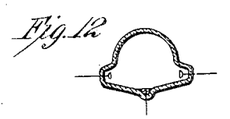
Figure 13:
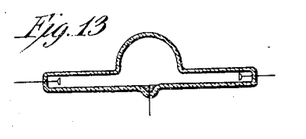
Figure 14:
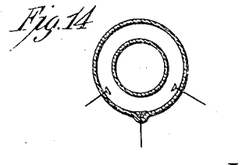

The mercury-vapor tube may be of a variety of forms, and preferably is one of sufficient size to give a considerable body of vapor for keeping the tube cool and the vacuum high during the operation of the apparatus. As illustrated in Fig. 12, it may be a tube of a substantially spherical shape, with the two anodes and cathode in its bottom. Or, as illustrated in Fig. 13, the anodes may be located at the ends of lateral tubes extending in opposite directions from the base of a chabmer, these lateral tubes increasing the resistance between the anodes and the cathode, and also increasing the potential necessary to operate the tube. Or, as shown in Fig. 14, the tube may be a ring—a construction which will give a wide defference in resistance between the short path from one anode to the cathode, and the long path from that anode to the cathode around the other side of the ring. A chamber could be added to the ring-tube, if desired, to increase its vapor capacity. The asymmetrical tube of Figs. 9 to 11 could be made in the form of any of these tubes with one of the anodes omitted or simply not utilized in making the circuit connections.

Figure 15:
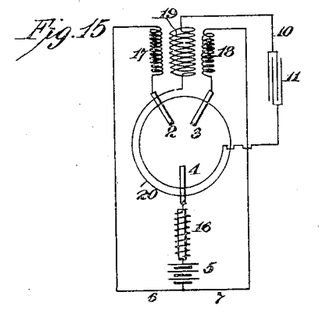

At the frequencies met with in ordinary alternating current practice, and even at very much higher frequencies, an ordinary open-air or inclosed arc may be used as the sensitive gap, such as is illustrated in Fig. 15, in which the parts are the same as described in connection with Fig. 4 except that the terminals 2, 3, and 4 of the vapor-tube are replaced by the carbon electrodes 2, 3, and 4 of an open or inclosed arc. Any of the other circuit arrangements described in connection with the vapor-tube having three terminals can be used with the three carbon electrodes.

Figure 16:
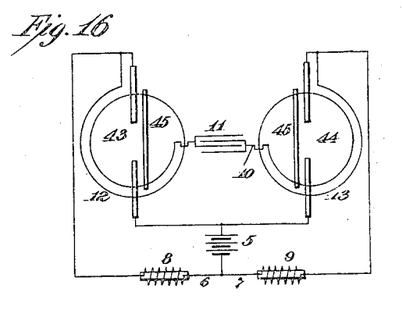

Fig. 16 shows an arrangement in which a shunt oscillating circuit is caused to act upon two separate sensitive gaps similar to the arrangement shown in Fig. 9, but with electric arcs 43 44 substituted for the vapor-tubes. Adjacent to each arc is placed a block of carbon 45. A current in the field-coils 12 13 tends to deflect these arcs in opposite directions with respect to their carbon-blocks. Thus, the arc 43 is deflected toward its block and its conductivity is not seriously diminished, while the arc 44 is deflected into space and its conductivity decreases materially. These changes in conductivity are caused to excite the oscillations in the oscillating circuit 10 in a manner similar to that described with reference to Fig. 9.

Figure 17:
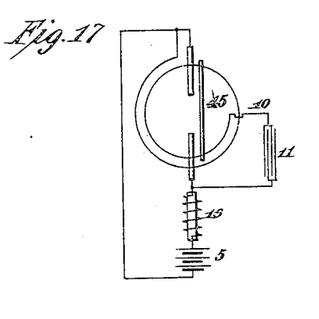

With an arc such as illustrated in Fig. 16, conditions are secured similar to those secured with the asymmetrical vapor-tube of Figs. 9 to 11, and hence it follows that such an arc may be employed in an arrangement similar to that illustrated in Fig. 11. This arrangement is shown in Fig. 17.

In the forms of apparatus above described, the sensitive gaps used have included a gas as the sensitive medium, but it is not necessary that the sensitive medium be gaseous. Similar results may be obtained by the use of a liquid or solid medium—for example, the tubes which were described as containing mercury vapor may be filled with a conducting liquid, or instead of the mercury-vapor tube, a mass of solid material may be used having three terminals, the current entering through two of these terminals and leaving through the third, or vice versa. It is desirable to use a sensitive medium whose specific resistance is high, or to so construct the sensitive gap that the act of commutation is accompanied by a considerable difference of potential between the terminals of the sensitive gap. This effect is promoted by the use of a gaseous medium which, under suitable conditions of pressure, temperature, and ionization, has the property of rapidly increasing conductivity with increasing current density, so that the effect of the concentration of current in a restricted path between one pair of electrodes is to greatly increase the conductivity of that path, while the conductivity of the other path is decreased. The result is a considerable potential difference available for exciting the oscillations. The effect of varying conductivity with varying current density may be in itself sufficient under proper conditions to maintain the oscillations. It is probable also that in a gaseous medium the direct effect of ionic bombardment of the anodes contributes largely to the useful result. It is evident, however, that the invention is not limited to any particular method of producing the electrical commutation, or dependent upon any special theory of operation.

Figure 18:
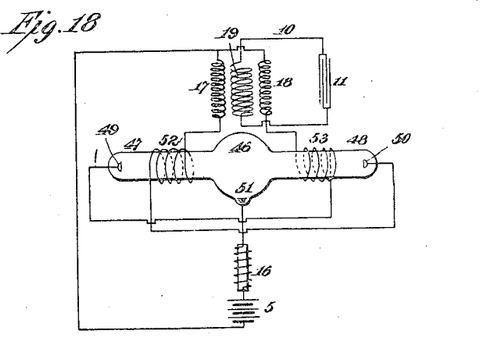

In Fig. 18 is shown a form of apparatus in which the conductivity of the alternative parts is varied in a somewhat different manner. Instead of causing the discharge through the commutating-gap to be deflected by a magnetic field whose flux is perpendicular to the direction of the current, I utilize the fact that a magnetic field, even though its flux be parallel to the direction of the current, has the effect of diminishing the conductivity of the conducting-column of gas in a vacuum-tube. A vaccum-tube 46 is provided with two protuberances 47, 48, in the ends of which are sealed anodes 49, 50. A single cathode 51 is provided near the center of the tube. Field-coils 52, 53 are wound around the protuberances 47, 48, and are connected in the branches of the divided primary circuit, which include the primaries 17, 18 acting on the secondary 19 of the oscillating circuit 10. When the current divides equally between the two parallel paths through the tube, the gas columns in the protuberances 47, 48 will have approximately equal conductivities; but if the current in 52, for instance, is greater than that in 53, the conductivity of the gas column in the branch 47 of the tube is diminished and a still larger proportion of the current will be forced through the gas column in the branch 48. This increase of current in the branch 48, the field-coil 52 and the primary 17, and the corresponding decrease in current in the branch 47 with the field-coil 53 and the primary 18, continue until a practically steady state of unequal current distribution is reached, when the primaries 17, 18 cease to act on the secondary 19 and the current in the oscillating circuit 10 reverses. This induces an electromotive force in the primaries 17, 18 (now acting as secondaries to the coil 19,) which tends to decrease the current in the branch 48 and increase that in the branch 47, thus starting a disturbance of the equilibrium in the opposite direction, and this process is repeated, thus sustaining the oscillations. Another phenomenon which may be utilized in a tube of similar construction is the tendency of an axial field to concentrate a cathode-beam in the direction of the magnetic flux, thus directing it toward the two anodes alternately.

Figure 19:
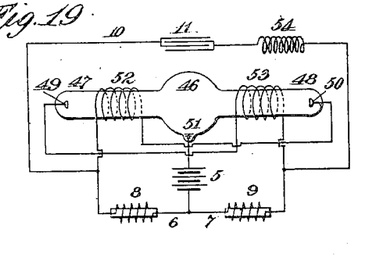

Figure 19 shows an arrangement embodying the same form of tube as that illustrated in Fig. 18, with connections similar to those shown in Fig. 1 in so far as the power-currents are maintained steady and the oscillating circuit is in shunt connection. The field-coils 52, 53 are wound and connected to their respective anodes 50 and 49, as in Fig. 18, and are connected respectively through the large steadying-inductances 8, 9 to one terminal of the source 5. The oscillating circuit 10 is connected in shunt across the coils 8, 9, so that any unequal distribution of current in the two branches of the tube will produce a current in the oscillating circuit, which is provided with an inductance 54. The current in the oscillating circuit is thus an alternating one, while the currents in the coils 52, 53 and their corresponding anodes 50 and 49 are pulsating currents. These pulsating currents have the effect of periodically diminishing the conductivity of the branches 47 and 48 of the tube alternately, as in the case illustrated in Fig. 18.

Figure 20:
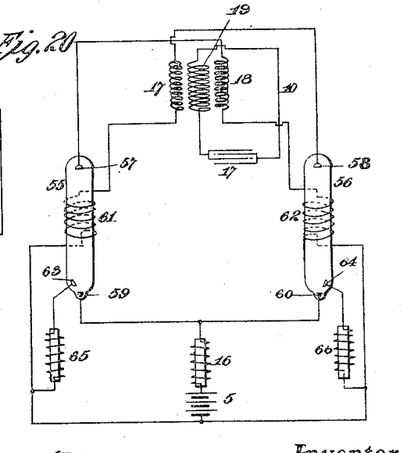
Figure 21:
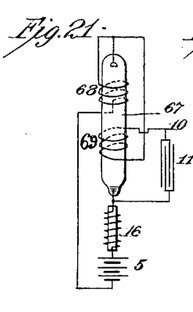

It is not necessary that the alternate paths should be included in the same tube. Fig. 20 shows an arrangement in which two separate tubes 55, 56 are used. These tubes have anodes 57, 58 and cathodes 59, 60, and are provided with field-coils 61, 62, which are connected at one end with one terminal of the direct-current source, and at their other ends are connected with the primary coils 17, 18, acting upon the secondary coil 19 in the oscillating circuit 10. Changes in the conductivities of the gas columns in the tubes 55, 56 will act in a manner similar to that described in reference to Figs. 18 and 19. In case the fields acting on the tubes are sufficient to completely interrupt the discharges, a set of auxiliary anodes 63, 64 may be provided, so placed as to be uninfluenced by the field, and connected through steadying inductances 65, 66 with the source of power. These auxiliary anodes will keep the cathode resistance broken down, so that the current through the main anodes 57, 58 will start again at the proper time. The steadying inductance 16 may then be omitted, if desired. A single tube of this character having only one anode may be employed to produce the oscillations. This is illustrated in Fig. 21, in which the tube 67 is provided with two field-coils 68, 69, the former being in series with the source of current 5 between the anode and the cathode, while the latter is in the oscillating circuit 10, which is shunted across the terminals of the tube. A plus current, for instance, in 69 will assist 68 and cause an increased plus current to flow in 69. A minus current in 69 will oppose 68 and improve the conductivity of the gas column and still further increase the minus current in 69. The periodic reversals of the oscillating circuit will, as already explained, produce the reversal of current in the coil 69.

Figures 22, 23:
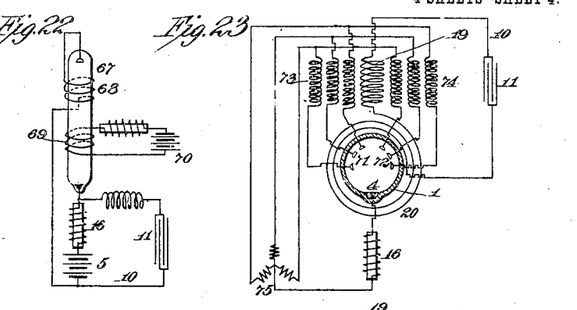

In Fig. 22 the variable anode-current is used to excite the field 68. As its variations are just the opposite to what is required, an auxiliary field 69 fed by a constant source 70 is opposed to and is greater than 68. The differential effects of 68 and 69 give the required result.

An alternating current, either single phase or polyphase, may be used instead of a direct current to feed the apparatus. Fig. 23 shows the apparatus supplied by a three-phase current. 1 is the vapor-tube, having a single cathode 4, and provided with six anodes, three of which, 71, are located on one side of the tube, and the other three, 72, on the other side of the tube. These anodes are connected to separate primaries 73, 74 of a transformer, whose secondary 19 is located in the oscillating circuit 10 containing the condenser 11 and the field-coil 20. The primaries 73 are wound in the same direction, so that their effects on the secondary 19 are similar, and the primaries 74 are wound in the opposite direction. The primaries 73 and 74 are connected in parallel in pairs, and each pair of the primaries is in series in circuit with one phase of a three-phase alternating-current generator 75, whose neutral point is connected through the steadying resistance 16 to the cathode 4 of the tube. The mode of operation of the apparatus is similar to that of the apparatus shown in Fig. 4. The vacuum-tube acts as a rectifier of the alternating current by permitting the current to flow only in one direction, i. e., from one or more of the anodes to the cathode, the opposite half-wave being excluded; and the sum of the half-waves in the three phases is equivalent to a direct current of nearly steady value. The fluctuations of this equivalent direct current being of low frequency, will not have any appreciable effect on the secondary 19, but the deflection of the current from one of the anodes 71 to the corresponding anode 72 will produce an effect on the secondary similar to that which occurs in the case of the direct current in Fig. 4.

Figure 24:
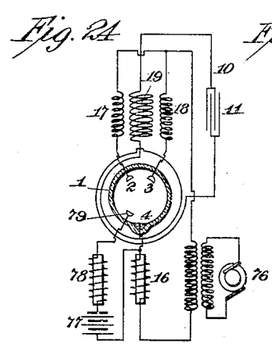

Fig. 24 shows the apparatus fed by a single-phase alternating current. In this case the tube 1 is provided with two anodes 2, 3, and the cathode 4, as in Fig. 4, the anodes being connected with the primaries 17, 18, which are connected in parallel with the source 76 of single-phase alternating current, the other pole of which is connected through the inductance 16 with the cathode 4. In this case the inductance 16 should be small enough to permit the ready passage of the alternating current from the source, or in some cases the inductance may be omitted altogether. As the single-phase alternating current when rectified by the tube 1 is discontinuous, it is necessary to supply means for starting the current through the tube at the beginning of each effective half-wave. To accomplish this, it is sufficient to keep the cathode resistance, which is high at starting, continuously broken down by means of a small electric current supplied by a local source 77 through a steadying-inductance 78 and an auxiliary anode 79. The alternating current will then start readily when the electromotive force is applied in the proper direction. When a single-phase alternating current is used, the supply of energy is intermittent; consequently the currents in the oscillating circuit 10 will be intermittent unless the damping of this circuit is so small that its oscillations may persist through the period of inactivity of the source. This feature possesses certain advantages when the apparatus is used as a transmitter in wireless telegraphy, as it causes the signals to be broken up into individual impulses recurring at the frequency of the alternating current, each impulse consisting of a train of waves of practically constant amplitude. Signals of this character are particularly desirable when the signals are received by ear, as an intermittent impulse gives a much stronger physiological effect than a continuous impulse. This feature is also advantageous in imparting a distinctive character to the radiations apart from their definite wave frequency, which enables them to be distinguished from signals from another source either audibly or by means of some automatic selecting apparatus.

A quarter-phase alternating current can be used in the same manner as a single-phase current by using two pairs of anodes and primaries instead of one; or it may be converted into a four-phase current in the well-known way, and used with four sets of anodes and primaries in a manner similar to that illustrated for three-phase currents in Fig. 23. In the former case the energy supply will be intermittent, and in the latter continuous though variable.

Figure 25:
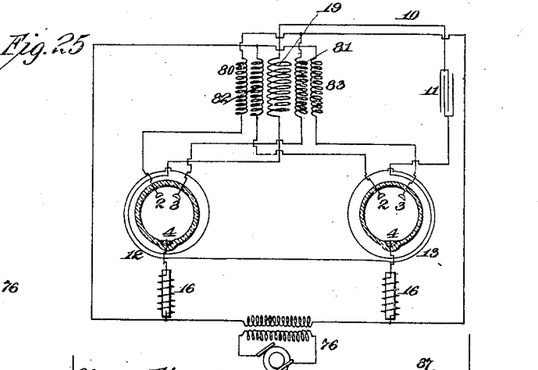

Whether the alternating-current supply be single phase or polyphase, it is desirable to have two sets of apparatus of the character illustrated in Figs. 23 and 24, having their polarities reversed with respect to the source of power. The second set of apparatus will then use the half-waves of the alternating current that are rejected by the first set. The two sets of apparatus may operate separate oscillating circuits, their respective primary coils being made to act on separate secondary coils, or they may be caused to act cumulatively on a single oscillating circuit. Fig. 25 shows an arrangement in which this is accomplished by causing the primary coils of the two systems to act on a single secondary. The case illustrated is that in which a single-phase alternating current is used. The primary coils 80, 81 of the first system are wound respectively in the same direction as the primaries 82, 83 of the second system, so that the two systems will act in the same sense and therefore cumulatively on the secondary 19, and the field-coils 12, 13 included in the oscillating circuit 10 are wound to have similar effects on the two tubes.

So far I have described only the method of and apparatus for producing the oscillations. They may be utilized in many ways; for example, in electrotherapeutics, in exciting high-frequency discharges in vacuum-tubes for lighting, in producing high potential effects through the agency of air core-transformers, and for many other purposes for which alternating currents, whether of extremely high or of lower frequencies, are desirable. They are especially useful in a transmitter for use in wireless telegraphy or wireless telephony. For this purpose the oscillating circuit may be coupled to a radiating antenna in any one of several well-known ways.

Figure 26:
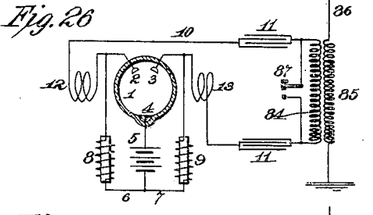

In Fig. 26 the oscillating circuit 10 is illustrated as supplied with energy by the arrangement of apparatus shown in Fig. 1. This oscillating circuit includes the primary 84 of a step-up transformer, whose secondary 85 is connected in series with the antenna-circuit 68, which is suitably tuned with respect to the primary circuit. The radiation is made intermittent at will for the purpose of producing signals by means of a key 87 which short-circuits the primary 84 of the step-up transformer and thus annuls its action on the antenna-circuit.

Figure 27:
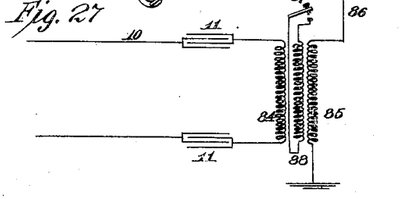

Another arrangement is shown in Fig. 27, in which the key 87 is placed in a tertiary circuit 88 of the step-up transformer. The closing of the key short-circuits the tertiary circuit and annuls the inductive effect of the primary 84 on the secondary 85.

Figure 28:
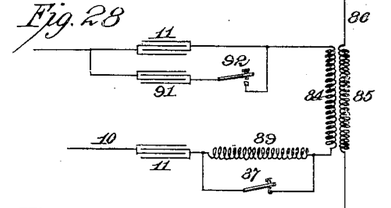

In Fig. 28 the key 87 is placed so as to short-circuit an auxiliary inductance 89, placed in the oscillating circuit 10. In this arrangement the radiation of energy from the antenna is continuous, but its frequency is altered by the presence or absence of the auxiliary inductance 89 in the oscillating circuit, and the latter is thus thrown in or out of tune with the antenna-circuit and with the receiving apparatus, which is assumed to be tuned to respond only to a given frequency of the transmitter. Instead of throwing the oscillating circuit in and out of tune with the antenna by changing the inductance of the circuit, the same result may be secured by changing the capacity of the oscillating circuit, as by opening and closing a circuit through an auxiliary condenser 91 by means of a key 92.

Figure 29:
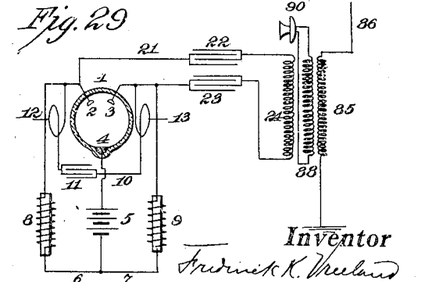

For wireless telephony it is preferable to employ an arrangement such as is shown in Fig. 29, in which the working oscillating circuit is separate from the oscillating circuit which excites the field, as illustrated in Fig. 5. The inductance 24 of Fig. 5 is utilized as the primary of a step-up transformer, whose secondary is in the antenna-circuit. The tertiary of the transformer is closed by a carbon telephone-transmitter 90, having a sufficient current-carrying capacity to answer the purpose. Any of the arrangements which have been described for producing the oscillations may be employed for utilizing such oscillations in any of the ways shown in Figs. 26 to 29.

The arrangement in which a separate working circuit is used in shunt with the exciting-circuit is particularly effective in wireless signaling and especially in wireless telephony. The period of the exciting-circuit determines the frequency of the oscillations, while the natural period of the working circuit determines the intensity of its oscillations. The latter are free oscillations of large amplitude when the two circuits are in tune, and a small variation in the electrical constants of the circuit will cause the resulting forced oscillations to fall off greatly in amplitude. Thus the radiation may be controlled by cutting in or out inductance or capacity—an operation which in this arrangement involves a small expenditure of energy and hence no special precaution for handling a large current. Thus a simple key of small size or a carbon telephone-transmitter may be used effectively. A similar result may be obtained by varying the electrical constants of the exciting-circuit. A further advantage of this arrangement is in the fact that the intensity and frequency of the exciting-current is practically independent of the amount of energy that is being drawn from the apparatus. The apparatus thus works in much the same manner as a shunt-dynamo, taking energy from the source of power in proportion to the energy expended in the working circuit. Where it is desired to increase the excitation with increasing output, a compound field, such as is illustrated in Fig. 3, may be used. The working circuit is not necessarily a tuned circuit; for some purposes an aperiodic circuit may be substituted for the tuned working circuit.

This application is a division of my application, Serial No. 247,826, filed February 28, 1905, in which the method herein described is claimed.

What I claim is—

1. An apparatus for producing electrical oscillations, wherein are combined an electrical oscillating circuit, a field excited or controlled by the oscillations of said electrical oscillating circuit and acting to electrically commutate energy, and means for adding by such commutation increments of energy to such oscillating circuit.

2. An apparatus for producing electrical oscillations, wherein are combined an electrical oscillating circuit, a field excited or controlled by the oscillations of such circuit, a sensitive gap or gaps acted upon by such field to electrically commutate energy therein, and means for adding by such commutation increments of energy to such oscillating circuit.

3. An apparatus for producing electrical oscillations, wherein are combined an electrical oscillating circuit, a magnetic field excited or controlled by the oscillations of such circuit and acting to electrically commutate energy, and means for adding by such commutation increments of energy to such oscillating circuit.

4. An apparatus for producing electrical oscillations, wherein are combined an electrical oscillating circuit, a magnetic field excited or controlled by the oscillations of said circuit, a sensitive gap or gaps acted on by said magnetic field to electrically commutate energy therein, and means for adding by such commutation increments of energy to such oscillating circuit.

5. An apparatus for producing electrical oscillations, wherein are combined an electrical oscillating circuit, a field excited or controlled by the oscillations of said circuit, a gaseous medium acted upon by said field to electrically commutate energy therein, and means for adding by such commutation increments of energy to such oscillating circuit.

6. An apparatus for producing electrical oscillations, wherein are combined an electrical oscillating circuit, a field excited or controlled by the oscillations of said circuit, a rarefied gaseous medium acted upon by said field to electrically commutate energy therein, and means for adding by such commutation increments of energy to such oscillating circuit.

7. An apparatus for producing electrical oscillations, wherein are combined an electrical oscillating circuit, a magnetic field excited or controlled by the oscillations of said circuit, a gaseous medium acted upon by said magnetic field to electrically commutate current therein, and means for adding by such commutation increments of energy to such oscillating circuit.

8. An apparatus for producing electrical oscillations, wherein are combined an electrical oscillating circuit, a magnetic field excited or controlled by the oscillations of said circuit, a vapor tube or tubes acted upon by said magnetic field to electrically commutate current in such tube or tubes, and means for adding by such commutation increments of energy to such oscillating circuit.

9. An apparatus for producing electrical oscillations, wherein are combined a variable magnetic field, two or more alternative circuits the conductivity of one or more of which is periodically altered by the influence of such variable magnetic field thereby causing a periodic variation in the currents in said circuits, means for exciting oscillations of definite frequency by these variable currents, and means for controlling the variations of the magnetic field by such oscillations.

10. An apparatus for producing electrical oscillations, wherein are combined a variable magnetic field, two or more alternative circuits the conductivity of one or more of which is periodically altered by the influence of such variable magnetic field, thereby causing a periodic variation in the currents in said circuits, means for controlling the variation of such magnetic field by such currents, and a circuit or circuits operatively connected with the system and controlling by means of capacity and inductance the frequency of the variations in said currents.

11. An apparatus for producing electrical oscillations, wherein are combined an electrical oscillating circuit, a sensitive medium through different paths in which an electric current passes, means for electrically commutating the current in such different paths, and means for adding by such commutation increments of energy to such oscillating circuit.

12. An apparatus for producing electrical oscillations, wherein are combined an electrical oscillating circuit, a gaseous medium through different paths in which an electric current passes, means for electrically commutating the current in such different paths, and means for adding by such commutation increments of energy to such oscillating circuit.

13. An apparatus for producing electrical oscillations, wherein are combined an electrical oscillating circuit, a plurality of similar paths or circuits, means for electrically commutating the energy in such similar paths or circuits in synchronism with the oscillations of the oscillating-circuit, and means for adding by such commutation increments of energy to the oscillating circuit.

14. An apparatus for producing electrical oscillations, wherein are combined an electrical oscillating circuit, a plurality of similar paths or circuits, means for electrically commutating electrical currents in such similar paths or circuits, and means for adding by such commutation increments of energy to the oscillating circuit.

15. An apparatus for producing electrical oscillations, wherein are combined an electrical oscillating circuit, two similar parallel circuits, means for electrically commutating electrical currents in said similar parallel circuits in synchronism with the oscillations of such oscillating circuit, and means for adding by such commutation increments of energy to the oscillating circuit.

16. An apparatus for producing electrical oscillations, wherein are combined an electrical oscillating circuit, a sensitive medium through different paths in which an electric current passes, a magnetic field affecting the current in such paths in synchronism with the oscillations of such oscillating circuit, thereby electrically commutating said current, and means for adding by such commutation increments of energy to such oscillating circuit.

17. An apparatus for producing electrical oscillations, wherein are combined an electrical oscillating circuit, a gaseous medium through different paths in which an electric current passes, a magnetic field affecting the current in such paths in synchronism with the oscillations of such oscillating circuit, thereby electrically commutating said current, and means for adding by such commutation increments of energy to such oscillating circuit.

18. An apparatus for producing electrical oscillations, wherein are combined an electrical oscillating circuit a vapor tube or tubes through different paths in which an electric current passes, a magnetic field affecting the current in such paths in synchronism with the oscillations of such oscillating circuit, thereby electrically commutating said current, and means for adding by such commutation increments of energy to such oscillating circuit.

19. An apparatus for producing electrical oscillations. wherein are combined an electrical oscillating circuit, a sensitive medium through different paths in which an electric current passes, an alternating magnetic field oppositely and alternately affecting the current in such paths to commutate the electric current in such medium, means for adding by such commutation increments of energy to such oscillating circuit, and means for controlling the alternating magnetic field by such oscillations.

20. An apparatus for producing electrical oscillations, wherein are combined an electrical oscillating circuit, a gaseous medium through different paths in which an electric current passes, an alternating magnetic field oppositely and alternately affecting the current in such paths, thereby commutating said current, means for adding by such commutation increments of energy to such oscillating circuit, and means for controlling the alternating magnetic field by such oscillations.

21. An apparatus for producing electrical oscillations, wherein are combined an electrical oscillating circuit, a vapor tube or tubes through different paths in which an electric current passes, an alternating magnetic field oppositely and alternately affecting the current in such paths, thereby commutating said current, means for adding by such commutation increments of energy to such oscillating circuit, and means for controlling the alternating magnetic field by such oscillations.

22. An apparatus for producing electrical oscillations, wherein are combined an electrical oscillating circuit, two channels in which a comparatively steady current is established connected with such circuit, a sensitive gap in each channel shunted by said circuit, and a magnetic field controlled by the oscillations in such circuit for producing opposite effects upon the current in the two gaps to divert current alternately from said channels through said oscillating circuit.

23. An apparatus for producing electrical oscillations, wherein are combined an oscillating circuit, two channels in which a comparatively steady current is established connected with such circuit, a sensitive gap in a gaseous medium included in each channel and shunted by said circuit, and a magnetic field controlled by the oscillations in such circuit for producing opposite effects upon the current in the two gaps to divert current alternately from said channels through said oscillating circuit.

24. An apparatus for producing electrical oscillations, wherein are combined an oscillating circuit, two or more alternative circuits through which an electric current passes, a sensitive gap or gaps in said alternative circuits, an alternating magnetic field whose flux is perpendicular to the current in said gap or gaps for periodically diverting the current therein, thereby electrically commutating the current in said circuits, means for adding by such commutation increments of energy to said oscillating circuit, and means for controlling the alternating magnetic field by such oscillations.

25. An apparatus for producing electrical oscillations, wherein are combined an electrical oscillating circuit, two alternative circuits through which an electric current passes, a sensitive gap in each of said alternative circuits, an alternating magnetic field whose flux is perpendicular to the flow of current through said gaps for diverting the current in said gaps alternately and oppositely, thereby electrically commutating the current in said circuits, means for adding by such commutation increments of energy to said electrical oscillating circuit, and means for controlling the alternating magnetic field by such oscillations.

26. An apparatus for producing electrical oscillations, wherein are combined an electrical oscillating circuit, a sensitive medium through two adjacent paths in which an electric current passes, an alternating magnetic field whose flux is perpendicular to the plane of said paths for diverting the current in said paths alternately and oppositely, thereby commutating the current in said paths, means for adding by such commutation increments of energy to said electrical oscillating circuit, and means for controlling the alternating magnetic field by such oscillations.

27. An apparatus for producing electrical oscillations, wherein are combined an electrical oscillating circuit, a vapor-tube through two adjacent paths in which an electric current passes, said tube being provided with two anodes and a single cathode, an alternating magnetic field acting on said tube and whose flux is perpendicular to the plane of the electrodes of the tube for diverting the current in said paths alternately and oppositely, thereby electrically commutating the current between the two paths in the tube, means for adding by such commutation increments of energy to said electrical oscillating circuit, and means for controlling said alternating field by such oscillations.

28. An apparatus for producing electrical oscillations, wherein are combined an electrical oscillating circuit, a magnetic field controlled thereby for commutating an electric current, a working circuit in parallel with the controlling oscillating circuit, and means for supplying to said working circuit the oscillations produced by said controlling oscillating circuit.

29. An apparatus for producing electrical oscillations, wherein are combined an electrical oscillating circuit, a magnetic field controlled thereby for commutating an electric current, a second or working oscillating circuit in parallel with and tuned to the same frequency as the controlling oscillating circuit, and means for supplying to said second or working oscillating circuit the oscillations produced by said controlling oscillating circuit.

30. An apparatus for producing electrical oscillations of variable intensity, wherein are combined an electrical oscillating circuit, a magnetic field controlled thereby for commutating an electric current, a second oscillating circuit, means for impressing such oscillations on said second oscillating circuit, and means for controlling the intensity of the oscillations by varying the electrical constants of one or both circuits.

31. An apparatus for producing electrical oscillations of variable intensity, wherein are combined a generator of sustained electrical oscillations, a resonant circuit, means for impressing such oscillations on said resonant circuit, and means for controlling the intensity of the oscillations in said circuit by throwing the circuit in and out of tune with the generator.

32. An apparatus for producing electrical oscillations of variable intensity, wherein are combined a generator of sustained electrical oscillations, a resonant circuit, means for impressing such oscillations on said resonant circuit, and means for controlling the intensity of the oscillations by varying the electrical constants of one or both parts of the system by shunting capacity or inductance.

33. An apparatus for producing electromagnetic waves, wherein are combined an electrical oscillating circuit, different paths in a sensitive medium through which paths an electric current passes, means for electrically commutating the current in said paths, means for adding by such commutation increments of energy to such oscillating circuit, a radiating circuit, and means for impressing such oscillations upon said radiating circuit.

34. An apparatus for producing electromagnetic waves, wherein are combined an electrical oscillating circuit, different paths in a gaseous medium through which an electric current passes, means for electrically commutating the current in such paths, means for adding by such commutation increments of energy to such oscillating circuit, a radiating circuit, and means for impressing such oscillations upon said radiating circuit.

35. An apparatus for producing electromagnetic waves, wherein are combined an oscillating circuit, a plurality of similar paths or circuits, means for electrically commutating energy in such similar paths or circuits in synchronism with the oscillations of such oscillating circuit, means for adding by such commutation increments of energy to such oscillating circuit, a radiating circuit, and means for impressing such oscillations upon said radiating circuit.

36. An apparatus for producing electromagnetic waves, wherein are combined an electrical oscillating circuit, a plurality of similar paths or circuits, means for electrically commutating electrical currents in such similar paths or circuits in synchronism with the oscillations of such oscillating circuit, means for adding by such commutation increments of energy to such oscillating circuit, a radiating circuit, and means for impressing such oscillations upon said radiating circuit.

37. An apparatus for producing electromagnetic waves, wherein are combined an electrical oscillating circuit, two similar parallel circuits, means for electrically commutating electrical currents in said parallel circuits in synchronism with the oscillations of such oscillating circuit, means for adding by such commutation increments of energy to such oscillating circuit, a radiating circuit, and means for impressing such oscillations upon said radiating circuit.

38. An apparatus for producing electromagnetic waves, wherein are combined an electrical oscillating circuit tuned to a high frequency, a field excited or controlled by the oscillations of said electrical oscillating circuit and acting to electrically commutate energy, means for adding by such commutation increments of energy to such oscillating circuit, a radiating circuit, and means for impressing such oscillations upon said radiating circuit.

39. An apparatus for producing electromagnetic waves, wherein are combined an electrical oscillating circuit tuned to a high frequency, a field excited or controlled by the oscillations of said circuit, a sensitive gap or gaps acted upon by said field to electrically commutate energy therein, means for adding by such commutation increments of energy to such oscillating circuit, a radiating circuit, and means for impressing such oscillations upon said radiating circuit.

40. An apparatus for producing electromagnetic waves, wherein are combined an electrical oscillating circuit tuned to a high frequency, a magnetic field excited or controlled by the oscillations of said circuit and acting upon an electric current to electrically commutate said current, means for adding by such commutation increments of energy to said electrical oscillating circuit, a radiating circuit, and means for impressing such oscillations upon said radiating circuit.

41. An apparatus for producing electromagnetic waves, wherein are combined an electrical oscillating circuit tuned to a high frequency, a magnetic field excited or controlled by the oscillations of said circuit, a sensitive gap or gaps, the electric current in said gap or gaps being acted upon by said field to electrically commutate the energy in such gap or gaps, means for adding by such commutation increments of energy to said electrical oscillating circuit, a radiating circuit, and means for impressing such oscillations upon said radiating circuit.

42. An apparatus for producing electromagnetic waves, wherein are combined an electrical oscillating circuit tuned to a high frequency, a magnetic field excited or controlled by the oscillations of said circuit, a gaseous medium, the electric current in such medium being acted upon by said field to electrically commutate said current, means for adding by such commutation increments of energy to said electrical oscillating circuit, a radiating circuit, and means for impressing such oscillations upon said radiating circuit.

43. An apparatus for producing electromagnetic waves, wherein are combined an electrical oscillating circuit tuned to a high frequency, a magnetic field excited or controlled by the oscillations of said circuit, a vapor tube or tubes, the electric current in such tube or tubes being acted upon by said field to electrically commutate said current, means for adding by such commutation increments of energy to said electrical oscillating circuit, a radiating circuit, and means for impressing such oscillations upon said radiating circuit.

44. An apparatus for producing electromagnetic waves, wherein are combined an oscillating circuit tuned to a high frequency, a sensitive medium through different paths in which an electric current passes, a magnetic field affecting the current in such paths in synchronism with the oscillations of such oscillating circuit to electrically commutate said current, means for adding by such commutation increments of energy to said oscillating circuit, a radiating circuit, and means for impressing such oscillations upon said rediating circuit.

45. An apparatus for producing electromagnetic waves, wherein are combined an oscillating circuit tuned to a high frequency, a gaseous medium through different paths in which an electric current passes, a magnetic field affecting the current in such paths in synchronism with the oscillations of such oscillating circuit to electrically commutate said current, means for adding by such commutation increments of energy to said oscillating circuit, a radiating circuit, and means for impressing such oscillations upon said radiating circuit.

46. An apparatus for producing electromagnetic waves, wherein are combined an oscillating circuit tuned to a high frequency, a sensitive medium through different paths in which an electric current passes, an alternating magnetic field oppositely and alternately affecting the current in such paths to commutate the electric current in such medium, means for adding by such commutation increments of energy to said oscillating circuit, means for controlling the alternating magnetic field by such oscillations, a radiating circuit, and means for impressing such oscillations upon said radiating circuit.

47. An apparatus for producing electromagnetic waves, wherein are combined an oscillating circuit tuned to a high frequency, a gaseous medium through different paths in which an electric current passes, an alternating magnetic field oppositely and alternately affecting the current in such paths to electrically commutate said current, means for adding by such commutation increments of energy to said oscillating circuit, means for controlling the alternating magnetic field by such oscillations, a radiating circuit, and means for impressing such oscillations upon said radiating circuit.

48. An apparatus for the wireless transmission of intelligence, wherein are combined an electrical oscillating circuit, different paths in a sensitive medium through which an electric current passes, means for electrically commutating the current in such different paths, means for adding by such commutation increments of energy to such oscillating circuit, a radiating circuit, means for impressing the oscillations upon said radiating circuit, and means for interrupting or varying the character or intensity of the radiations to convey intelligence.

49. An apparatus for the wireless transmission of intelligence, wherein are combined an electrical oscillating circuit, different paths in a gaseous medium through which an electric current passes, means for electrically commutating the current in such different paths, means for adding by such commutation increments of energy to such oscillating circuit, a radiating circuit, means for impressing the oscillations upon said radiating circuit, and means for interrupting or varying the character or intensity of the radiations to convey intelligence.

50. An apparatus for the wireless transmission of intelligence, wherein are combined an electrical oscillating circuit, a plurality of similar paths or circuits, means for electrically commutating energy in said similar paths or circuits in synchronism with the oscillations of such oscillating circuit, means for adding by such commutation increments of energy to such oscillating circuit, a radiating circuit, means for impressing such oscillations upon said radiating circuit, and means for interrupting or varying the character or intensity of the radiations to convey intelligence.

51. An apparatus for the wireless transmission of intelligence, wherein are combined an electrical oscillating circuit, a plurality of similar paths or circuits, means for electrically commutating electrical currents in said similar paths or circuits in synchronism with the oscillations of such oscillating circuit, means for adding by such commutation increments of energy to such oscillating circuit, a radiating circuit, means for impressing such oscillations upon said radiating circuit, and means for interrupting or varying the character or intensity of the radiations to convey intelligence.

52. An apparatus for the wireless transmission of intelligence, wherein are combined an electrical oscillating circuit, two similar parallel circuits, means for electrically commutating electrical currents in said similar parallel circuits in synchronism with the oscillations of such oscillating circuit, means for adding by such commutation increments of energy to such oscillating circuit, a radiating circuit, means for impressing such oscillations upon said radiating circuit, and means for interrupting or varying the character or intensity of the radiations to convey intelligence.

53. An apparatus for the wireless transmission of intelligence, wherein are combined an electrical oscillating circuit, a field excited or controlled by the oscillations of said circuit and acting to electrically commutate energy, means for adding by such commutation increments of energy to such electrical oscillating circuit, a radiating circuit, means for impressing the oscillations on said radiating circuit, and means for interrupting or varying the character or intensity of the radiations to convey intelligence.

54. An apparatus for the wireless transmission of intelligence, wherein are combined an electrical oscillating circuit, a magnetic field controlled thereby for commutating an electric current to produce electrical oscillations, a radiating circuit, means for impressing such oscillations upon said radiating circuit, and means for interrupting or varying the character or intensity of the radiations to convey intelligence.

55. An apparatus for the wireless transmission of intelligence, wherein are combined an electrical oscillating circuit, a magnetic field controlled thereby for commutating an electric current whereby sustained electrical oscillations are continuously generated, a radiating circuit, means for impressing such oscillations upon said radiating circuit, and means for interrupting or varying the character or intensity of the radiations to convey intelligence.

56. An apparatus for the wireless transmission of intelligence, wherein are combined an electrical oscillating circuit, a magnetic field controlled thereby for commutating an electric current whereby sustained electrical oscillations are continuously generated, a radiating circuit, means for impressing such oscillations upon said radiating circuit, and means for interrupting or varying the character or intensity of the radiations by varying the electrical constants of the system to convey intelligence.

57. An apparatus for the wireless transmission of intelligence, wherein are combined two oscillating circuits, a radiating circuit, means for impressing upon said radiating circuit the electrical oscillations set up in said oscillating circuits, means for controlling the frequency of the radiations by one oscillating circuit, and means for controlling the intensity of the radiations by varying the electrical constants of one or both oscillating circuits.

58. An apparatus for the wireless transmission of intelligence, wherein are combined two electrical oscillating circuits, a magnetic field for commutating an electric current whereby sustained electrical oscillations are continuously generated in said system of circuits, means for controlling the rate of commutation by the oscillations of one of the oscillating circuits, a radiating circuit, means for impressing the oscillations of the other oscillating circuit upon said radiating circuit, and means for controlling the intensity of the radiations by varying the electrical constants of one or both oscillating circuits.

59. An apparatus for the wireless transmission of intelligence, wherein are combined a generator continuously generating sustained electrical oscillations, a resonant circuit, means for impressing such oscillations on said resonant circuit, means for exciting electromagnetic radiations by the oscillations in the resonant circuit, and means for controlling the intensity of the radiations by throwing the resonant circuit in and out of tune with the generator.

60. An apparatus for the wireless transmission of intelligence, wherein are combined a generator of sustained electrical oscillations, a resonant circuit, means for impressing such oscillations on said resonant circuit, means for exciting electromagnetic radiations by the oscillations in the resonant circuit, and means for controlling the intensity of the radiations by varying the relative frequency of the generator and the resonant circuit.

61. An apparatus for the wireless transmission of intelligence, wherein are combined a generator of sustained electrical oscillations, a resonant circuit, means for impressing such oscillations on said resonant circuit, means for exciting electromagnetic radiations by the oscillations in the resonant circuit, and means for controlling the intensity of the radiations by shunting capacity or inductance.

This specification signed and witnessed this 9th day of November, 1905.

FREDERICK K. VREELAND.

Witnesses:
    AUG. LONG,
    JOHN S. LOTSCH.